(12) United States Patent
Dackefjord et al.

(10) Patent No.: US 10,371,788 B2
(45) Date of Patent: Aug. 6, 2019

(54) DEVICE POSITIONING

(71) Applicant: NIDA TECH SWEDEN AB, Malmö (SE)

(72) Inventors: Håkan Dackefjord, Älvsjö (SE); Bogdan Shelest, Kiev (UA)

(73) Assignee: NIDATECH SWEDEN AB, Malmo (SE)

( * ) Notice: Subject to any disclaimer, the term of this patent is extended or adjusted under 35 U.S.C. 154(b) by 280 days.

(21) Appl. No.: 15/375,249

(22) Filed: Dec. 12, 2016

(65) Prior Publication Data

US 2017/0090010 A1 Mar. 30, 2017

Related U.S. Application Data

(63) Continuation of application No. PCT/SE2015/050593, filed on May 22, 2015.

(30) Foreign Application Priority Data

Jun. 12, 2014 (SE) ...................................... 1450732

(51) Int. Cl.
*H04W 24/00* (2009.01)
*G01S 5/06* (2006.01)
*G01S 5/10* (2006.01)
*G01S 5/14* (2006.01)
*G01S 5/02* (2010.01)
*H04W 4/02* (2018.01)
*H04W 64/00* (2009.01)

(52) U.S. Cl.
CPC .............. *G01S 5/06* (2013.01); *G01S 5/0252* (2013.01); *G01S 5/10* (2013.01); *G01S 5/14* (2013.01); *H04W 4/025* (2013.01); *H04W 64/006* (2013.01)

(58) Field of Classification Search
None
See application file for complete search history.

(56) References Cited

U.S. PATENT DOCUMENTS

| 5,926,765 A | 7/1999 | Sasaki |
| 2004/0198392 A1 | 10/2004 | Harvey et al. |
| 2004/0203872 A1 | 10/2004 | Bajikar |
| 2009/0170526 A1* | 7/2009 | Strutt .................... G01S 5/0289 455/456.1 |
| 2010/0302014 A1 | 12/2010 | Gloo et al. |
| 2013/0005349 A1 | 1/2013 | Sanders et al. |
| 2013/0260782 A1 | 10/2013 | Un et al. |

FOREIGN PATENT DOCUMENTS

| EP | 2542001 A1 | 1/2013 |
| WO | 2014007754 A2 | 1/2014 |

* cited by examiner

*Primary Examiner* — Suhail Khan
(74) *Attorney, Agent, or Firm* — Gabriela B. Tomescu, Esq.; Bergenstråhle & Partners AB

(57) ABSTRACT

Described are, among other things, a method, a device and a computer program wherein a large search area for a device that is to be located is successively narrowed by moving and/or rotating a locator device.

14 Claims, 6 Drawing Sheets

DEVICE POSITIONING

This application is the continuation of International Application No. PCT/SE2015/050593, filed 22 May 2015, which claims the benefit of Swedish Patent Application No. SE 1450732-1, filed 12 Jun. 2014, the entire contents of which are hereby incorporated by reference.

TECHNICAL FIELD

The present disclosure relates to methods and devices for locating a device.

BACKGROUND

It is known to identify the geographical position of mobile devices, such as cellular telephones, PDAs etc., by the aid of so-called triangulation. The approximate localization of the mobile devices is defined via the sensing of signal strength of the radio of at least three radio towers, i.e. base stations, of the network of the mobile device. Other positioning methods, such as Cell ID, CGI/TA, E-CGI and A-GPS are also available.

It is further known to identify the position of lost or stolen objects by the aid of GPS positioning means. Objects may hereby be equipped with preferably concealed GPS trackers, i.e. GPS receivers, which are actuatable by a center station or a user via radio communication to collect positioning data for the object from GPS satellites. Such tracker is known from for instance GB2483459 A or GB2484273 A. A drawback with these types of trackers is that they require a costly mobile phone subscription and a configuration of for instance a GSM modem and GPS receiver devices. Said devices are highly energy consuming and therefore need to be equipped with relatively bulky batteries which requires constant charging and operator discipline in terms of shutting the GPS tracker on and off to work as intended. The increased cost, size, weight and bulkiness further reduces the GPS trackers usability for certain applications wherein such parameters are preferably kept low, e.g. to track stolen bicycles, vehicles etc. For instance, it is generally not feasible to track objects of relatively low cost compared to the GPS trackers themselves, and a single user may not be able to afford to equip all objects he desires with expensive GPS trackers. Some objects, such as for instance bicycles or motorbikes are stolen in large volumes, generating high costs not only for the owners but further to the insurance companies. A further drawback is that a stolen or lost object to be tracked by using a GPS tracker may be positioned such that their ability to receive either GPS signals or signals via the mobile network is highly reduced, whereby their tracking ability is incapacitated.

There is a constant desire to provide improved and cheaper methods and devices for location devices, in particular lost devices.

SUMMARY

It is an object of the present invention to provide improved methods and devices for locating devices, in particular lost devices.

This object and/or others are obtained by the methods and devices as set out in the appended claims.

As is set out above existing methods for finding lost objects/devices typically involves the use of relatively expensive and complex hardware.

To provide a cheaper and smaller method for location of a, typically lost, device, a distance measurement for example based on a radio transmission round trip time from a locator device can be utilized. Optionally or as a supplement a direction determination can be made. Both the locator device and the (lost) device are provided with radio frequency transceivers. The locator device can further determine the distance and or direction to the (lost) device with some accuracy. For example the round trip time (RTT) for a message from the locator device to the (lost) device can be determined with some accuracy. When the distance and or direction, with an error, has been determined a geographical area can be formed which is limited by the distance and or direction with respective determined errors. The limited area can then be sub-divided into sub-areas. By successively creating new geographical areas when moving a locator device, any sub-area not covered by all geographical areas formed can be eliminated until the area of the remaining sub-area(s) is sufficiently small. The location of the device can then be determined to be at the remaining sub-area(s).

In accordance with one embodiment method of determining the location of a device comprising a radio transmitter is provided. The method comprises receiving in a locator device a radio signal from said device, determining a distance to the device from the locator device at the position of the locator device. The determined distance has a determined distance accuracy; and/or determine a direction to the device with a determined direction accuracy.

The determined distance and or direction is based on the radio signal received from the device, forming a geographical area with boundaries set as the determined distance+/−said determined accuracy, and/or as the determined direction+/−said determined direction accuracy, subdividing the geographical area into a number of sub-areas, and removing any sub area that is not included in all geographical areas formed for each new position of the locator device, moving the locator device to a new position and repeating removal of sub-areas until the total area of the remaining sub-areas is below a threshold value.

determining the location of the device as the area as the remaining sub-areas.

In accordance with one embodiment the removal of sub-areas is repeated until the number of remaining sub-areas is reduce to only one remaining sub-area.

In accordance with one embodiment the received signal from the device is a signal received in response to a signal transmitted to the device from the locator device.

In accordance with one embodiment the distance to the device is determined based on the roundtrip time for transmitted radio signal and the received response signal.

In accordance with one embodiment the roundtrip time is received from the device by the locator device.

In accordance with one embodiment the direction to the device is determined based on the direction having the strongest received signal strength.

In accordance with one embodiment the direction is also determined based on the direction opposite to the direction having the weakest received signal strength.

Using such a method for determining the position of a device makes it possible to use a cheap and small device to be located. The device used for locating can be any suitable device including a smart phone or a similar device. Also the successive search method as set out above will enable the user to select the precision with which the location of the (lost) device is given. This can for example be done by selecting the settings for the sub-areas to a small area and/or by setting the number of remaining sub-areas to a small number typically only one, when the successive searching is determined to be completed. A more precise determination of the location of the (lost) device will typically require more successive new locations for the locator device. Also the precision will become improved if the (lost) device is stationary or at least moves more slowly than the locator device.

The invention also extends to a mobile locator device and a computer program product adapted to perform the above methods.

BRIEF DESCRIPTION OF THE DRAWINGS

The present invention will now be described in more detail by way of non-limiting examples and with reference to the accompanying drawings, in which.

DETAILED DESCRIPTION

An object like a property, merchandise, or a person is provided with a device comprising a radio frequency transceiver. The device is typically passive and may in one mode only receive signals. At some time a user wants to locate the object having the device. Examples of such an occasion can be, without limitation, when the object has been stolen, lost, or when a person having the device is missing. In such a situation the user may can, using a locator device locate the device. The locator device will be described in more detail below.

Figure 1:
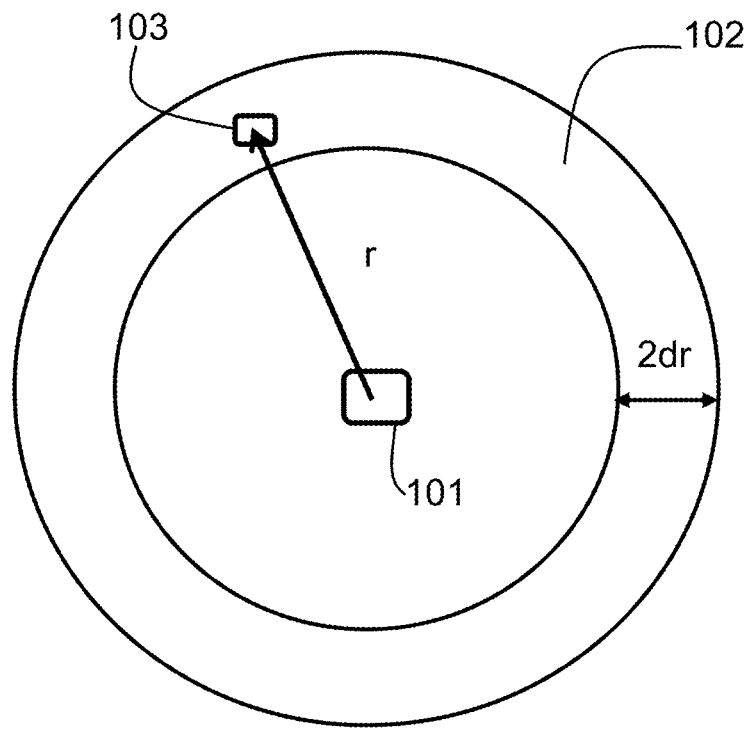
FIG. 1 is a general view of a scenario when locating a device.

In FIG. 1 a general view of a scenario where a locator device 101 is used to locate a device 103. The locator device 101 is provided with a transceiver for transmitting receiving radio signals over an air interface. In a similar manner the device 103 is provided with a transceiver for transmitting radio signals over an air interface. The devices 101 and 103 will be described in more detail below. The devices 101 and 103 can be in direct communication with each other over the air-interface for example using a Local Area Network (LAN) protocol signaling or a similar communication protocol. The LAN signaling protocol can be any suitable protocol such as IEEE 802.11 (Institute of Electrical and Electronics Engineers), including but not limited to 802.11a/b/n or other similar forthcoming standards. Other examples of standards which may be supported are: Zigbee, Bluetooth, RFID (Radio frequency identification), USB (Universal serial bus). The mentioned protocols may also be carried by various frequencies, such as 433 MHz, 450 MHz, 900 MHz, 2.4 GHz, or 5 GHz, not limiting usage of other suitable frequencies or any similar protocol. For example, the locator device 101 can transmit a message over the air interface to the device 103. In response to the message transmitted from the locator device 101, the device 103 can transmit a response message over the air interface back to the locator device 101. In some embodiments the device 103 continuously transmits a signal and there is then no need to transmit a signal from the locator device 101 to which the device 103 responds. Based on the response message from the device 103, the locator device 101 can provide an estimate of the distance r to the device 103 from the locator device 101 The estimate r can for example be calculated based on the signal strength of the response signal or the round trip time (RTT) of a message and a response to/from the device 103. In an alternative embodiment the device 103 can be set to determine the distance r and communication the distance or a parameter from which the distance can be determined such as the RTT. The distance r or the parameter value can then be communicated to the locator device 101.

The distance r will be an approximate distance that will have some degree of inaccuracy dr. The device can therefore be determined to be located within a geographical area 102 limited by two concentric circles having a distance between them of 2*dr. This is depicted in FIG. 1.

The locator device 101 and the device 103 communicate over an air interface using a direct communication link as set out above. A user holding the locator device 101 can then, when searching for the device 103, limit the area where the device 103 is located to the geographical area 102 limited by the two concentric circles. This geographical area 102 here limited by the two concentric circles can be denoted "original search area". When the direct link between the locator device 101 and the device 103 is, for example, a LAN protocol link, the inaccuracy dr of the distance r to the device 103 from the locator device 101 can be relative large. The original search area 102 can then be large.

In order to limit the geographical area where the device 103 can be located to establish a more precise location of the device 103, some different methods can be used. In accordance with some embodiments the original search area 102 is subdivided into a number of sub areas. Sub areas are then successively eliminated from the original search area until only one (or a few) sub areas remain. The device 103 is then determined to be located at said remaining sub area (s). Each sub area can in accordance with one embodiment be represented by one position. In such an embodiment the original search area will be represented by a number of discrete positions, where each position represents a sub-area. The discrete positions are then successively eliminated, thereby narrowing the area in which the device 103 is located.

Figure 2:
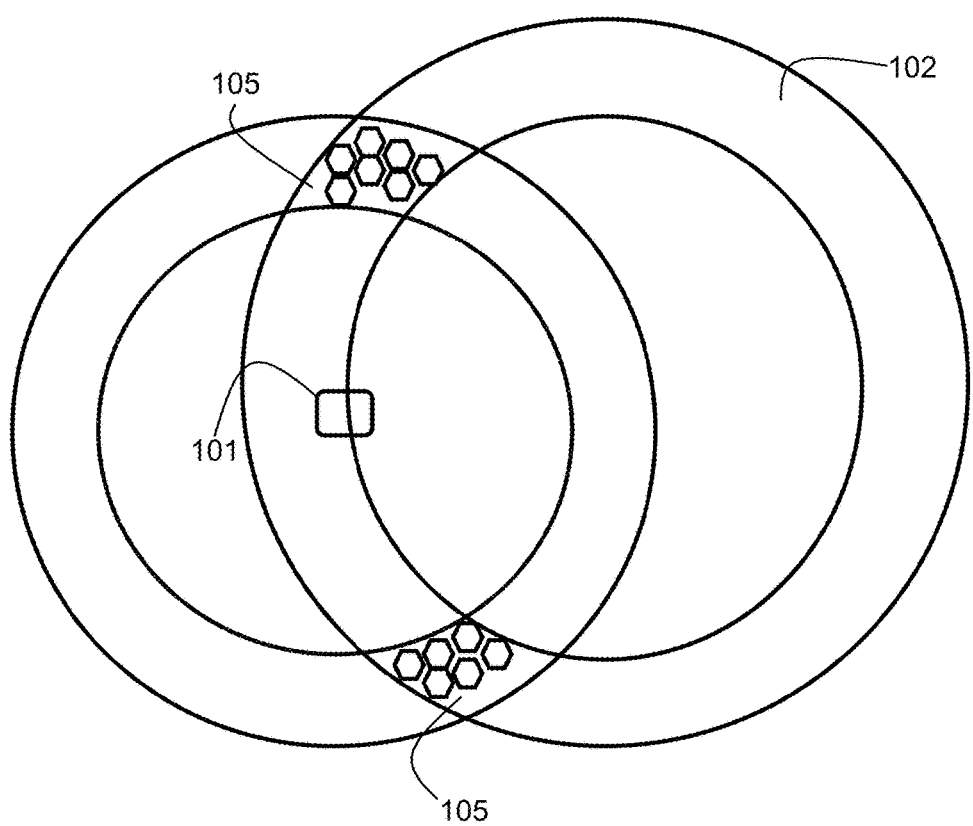
FIG. 2 is a view illustrating elimination of sub areas in accordance with a first embodiment.

In a first embodiment sub-areas are eliminated by moving the locator device 101 to new position(s) and generate a new geographical area limited by two concentric circles at the new position. This is depicted in FIG. 2. In FIG. 2, the locator device has been moved from a first position to a second position. When in the second position sub areas of the original search area can be eliminated. Thus, any sub area in the original search area not being covered by the new geographical area at the new position of the locator device 101 is eliminated from the set of remaining sub areas. In FIG. 2 the remaining sub areas are indicated at 105. As stated above each sub-area can be represented by a discrete location having an area around it. This procedure is repeated until the area of the remaining sub areas 105 is below some threshold value. The device 103 is then determined to be located at said remaining sub area (s).

Figure 3:
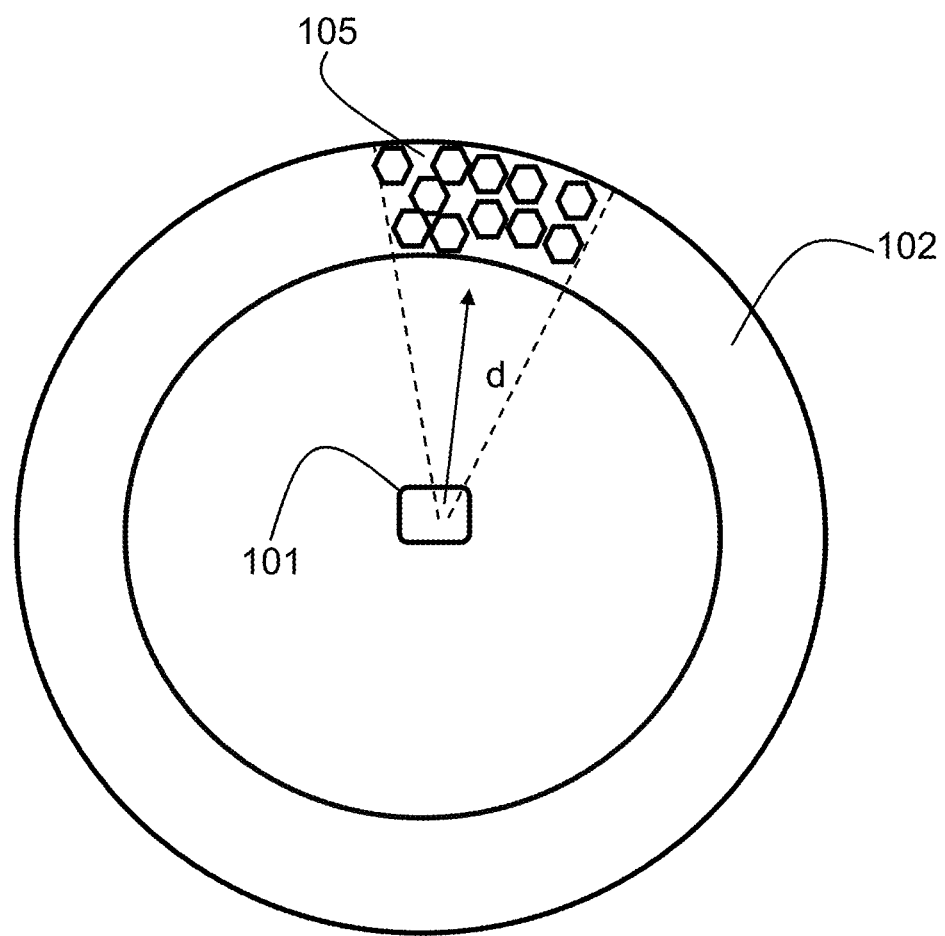
FIG. 3 is a view illustrating elimination of sub areas in accordance with a second embodiment.

In a second embodiment subareas are eliminated by determining a direction to the device 103 from the locator device 101. This can for example be performed by letting the user rotate 360 degrees with the locator device in his/her hands. The body of the user then acts as shield. It is envisaged that a separate shield other than the body of the user can be used when rotating the device. The direction with the strongest received signal can then be determined to be the direction in which the device 103 is located. The direction can in some embodiments be given with some inaccuracy and any sub area outside the determined direction d+/−some inaccuracy angle is eliminated from the original search area. This is depicted in FIG. 3. The direction d can for example be determined as the direction providing the strongest received signal from the device 103, for example as given by the received signal strength indicator (RSSI) in a protocol used for the transmission between the locator device 101 and the device 103. It is to be noted that the method described in conjunction with FIG. 3 can be used without a distance determination as set out above in conjunction with FIGS. 1 and 2. In such an implementation the original search area 102 will have the form of a sector limited by an original direction+/−a determined error for the original direction. Again the sub-areas can be represented by discrete positions having an area surrounding the position.

In accordance with one embodiment, the direction is determined based on the direction with the strongest signal and a direction opposite to the direction with the weakest signal. For example the direction can be determined to be in the direction of the vector sum of the direction with the strongest RSSI and the direction opposite to the direction with the weakest RSSI+/−an error. The error can be predetermined or a function of some parameters. For example the function can be based on the difference between the direction with the strongest RSSI and the direction opposite to the direction with the weakest RSSI. In such an embodiment if there is a large difference between the direction with the strongest RSSI and the direction opposite to the direction with the weakest RSSI, there will be a larger error used in the search method procedure than if there is a smaller difference in the direction.

The locator device can be provided with positioning means to keep track of the position of the locator device 101 and may also be provided with a compass to keep track of the orientation of the locator device 101. The orientation of the locator device 101 is particularly useful if the method in accordance with the second embodiment is used. The compass then makes it possible to associate the received signal strength with different directions.

Figure 4:
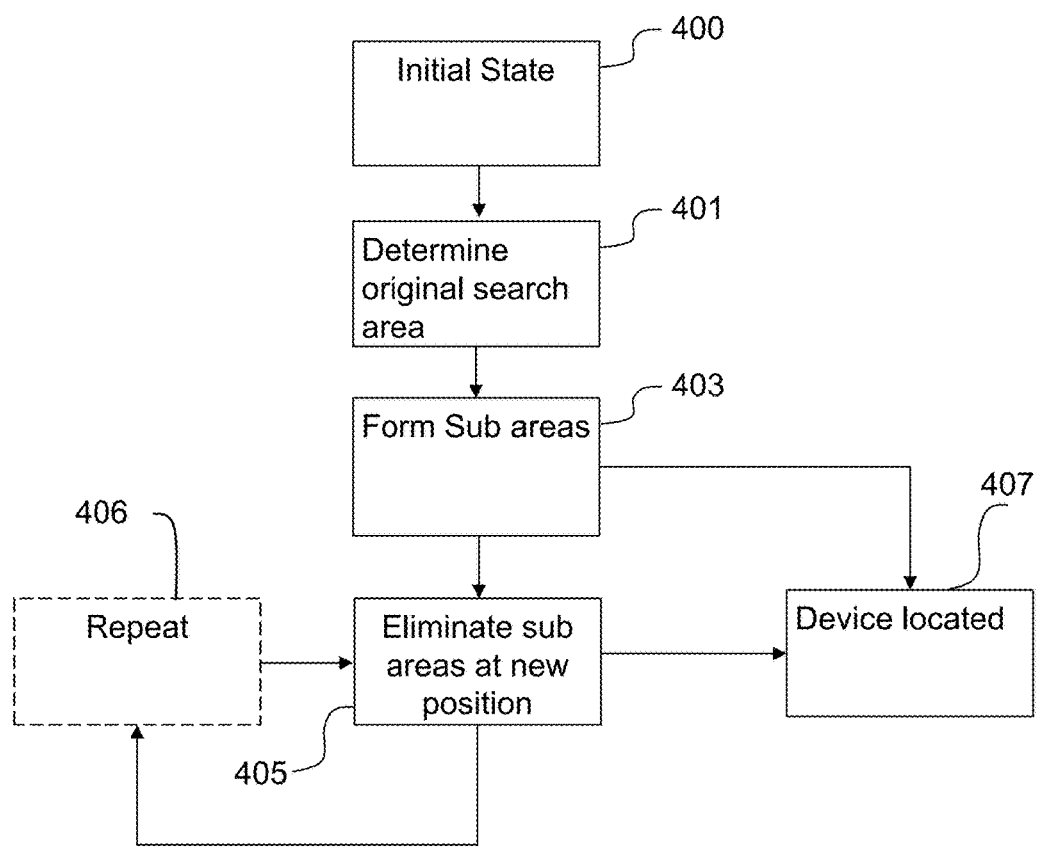
FIG. 4 is a flowchart illustrating some steps performed when locating a device.

Further, it is possible to combine the methods in accordance with the first and second embodiment. In FIG. 4 a flow chart depicting some steps that can be performed by a user using a locator device 101 in accordance with an exemplary implementation is shown. It is to be noted that it is not necessary to perform all of the steps described in conjunction with FIG. 4. A user can elect to only perform some of the steps for eliminating sub areas and can stop eliminating sub areas at any time. In particular it is possible to stop eliminating sub areas when the user determines that the remaining subarea is small enough. In the exemplary embodiment of FIG. 4, first in an initial step 400, it is assumed that a user holding a locator device 101 is searching for a device 103. Next, in a step 401 an original search area is determined as an area limited For example, an estimate of the distance r to the device 103 from the locator device 101 can be used to generate an area as described above in conjunction with FIG. 1. In accordance with another embodiment the original search area can be determined as a direction with an error as described above in conjunction with FIG. 3. The original search area will then be a geographical area limited by two concentric circles having a distance between them as depicted in FIG. 1 or a sector limited by the determined angular error for a direction determined as described in conjunction with FIG. 3 or a combination thereof. Next, in a Step 403, the original search area is divided into a number of subareas in accordance with some method. For example sub-areas of some size are set to cover the original search area. In one embodiment a number of discrete points are distributed over the original search area where each discrete point represents a sub area. Next, elimination of sub areas is performed in a step 405. The elimination in step 405 can be performed when the user moves to a new position. At the new position the user can perform new eliminations of sub areas by repeating the elimination process for the new position. For example in step 405 the user can generate a new search area and eliminate all sub areas from the original search area not covered by a new search area and the original search area. This can for example be performed as described in conjunction with FIG. 2. Also in step 405 the user can (again) rotate to determine a direction to the device 103 from the locator device 101 as described in conjunction with FIG. 3 to further eliminate subareas from the original search area. Step 405 can be repeated in as step 406 as many times as is deemed necessary for finding an accurate enough position of the device 103. It is to be noted that the elimination of sub-areas can be performed at any time during the positioning procedure as described herein. That is, if at any time there is information that makes it possible to eliminate sub-areas such a step 405 can be performed. At any time during the procedure described in FIG. 4 the elimination procedure can be terminated and the area of the remaining subareas is determined to be the location of the device 103. This is indicated at step 407.

Figure 5:
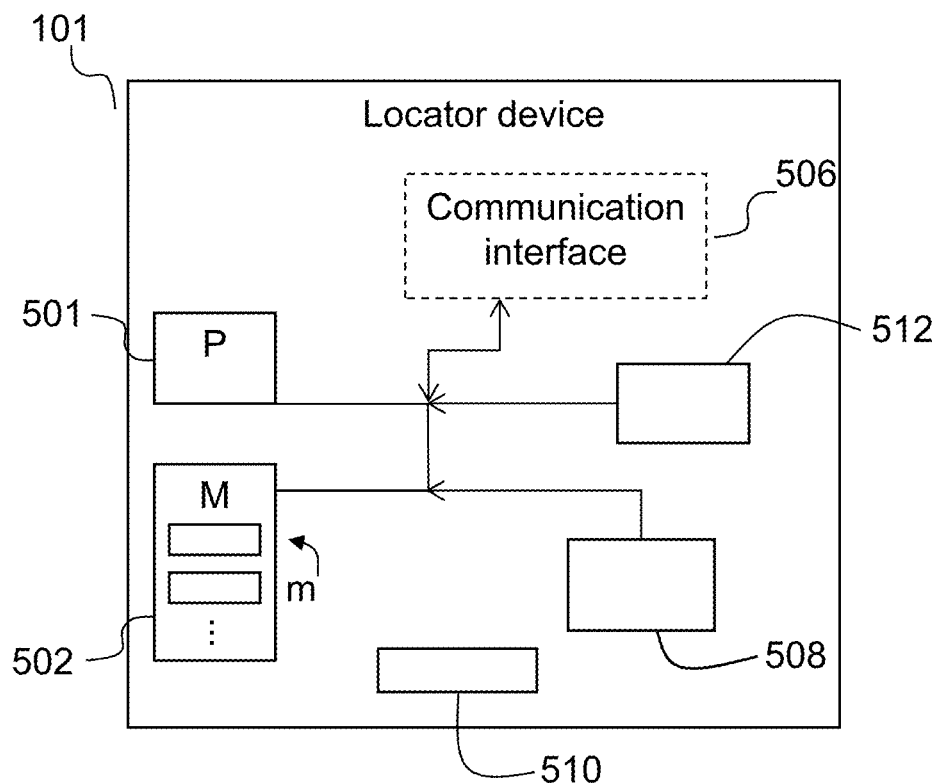
FIG. 5 is a view of a locator device.

The locator device 101 can be a User equipment (UE) such as a mobile phone, smart phone, PDA, tablet, PC or similar or it can be a dedicated locator device. An exemplary locator device 101 is depicted in FIG. 5. The locator device 101 may comprise a processing unit, radio transceiver unit, antenna, battery, and optionally other supporting components for making a locator device 101 operational.

FIG. 5 shows an exemplary embodiment of a locator device 101. The locator device 101 may be implemented, by a hardware device such as set out above. The locator device can have program modules of a respective computer program comprising code means which, when run by a processing unit 501 causes the device 101 to perform the above-described methods. The processing unit 501 may comprise a single Central Processing Unit (CPU), or could comprise two or more processing units. For example, the processing unit 501 may include general purpose microprocessors, instruction set processors and/or related chips sets and/or special purpose microprocessors such as Application Specific Integrated Circuits (ASICs). The processing unit 501 may also comprise a storage for caching purposes.

Each computer program may be carried by a computer program product 502 in the locator device 101 in the form of a memory having a computer readable medium and being connected to the processing unit 501. The computer program product 502 or memory thus comprises a computer readable medium on which the computer program is stored e.g. in the form of computer program modules "m". For example, the memory 502 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the device 502.

The locator device 101 may further comprise a communication unit 506. The communication unit is in particular arranged to communicate with the device 103 via a direct radio communication channel. The communication unit 506 may also be arranged for programming and/or configuration of the locator device 101. In an embodiment the communication unit 506 may comprise chip set adopted for communication via IEEE 802.11 (Institute of Electrical and Electronics Engineers), including but not limited to 802.11a/b/n or other similar forthcoming standards. Other examples of standards which may be supported by the communication unit 506 are: Zigbee, Bluetooth, RFID (Radio frequency identification), USB (Universal serial bus). The communication unit 506 may comprise an antenna. The communication unit 506 may be connectable to an external antenna.

The locator device 101 may comprise a power supply unit 510. The power supply unit may be arranged for power supply of: the processing unit 501, the memory unit 502, and/or the communication unit 506. Examples of a power supply unit 510 are, battery, capacitor, fuel cell, solar cell, inductive contact, USB-contact (Universal serial bus), wired contact, not limiting to other examples suitable for a power supply unit 510. In addition the locator device 101 can comprise a compass 508. The compass can be used to provide input regarding directions. This is for example useful when the user is locating a device by rotating to find the direction having the strongest RSSI as described above. The locator device can also comprise a positioning device 512 such as a GPS receiver for keeping track of the position of the locator device 101.

Figure 6:
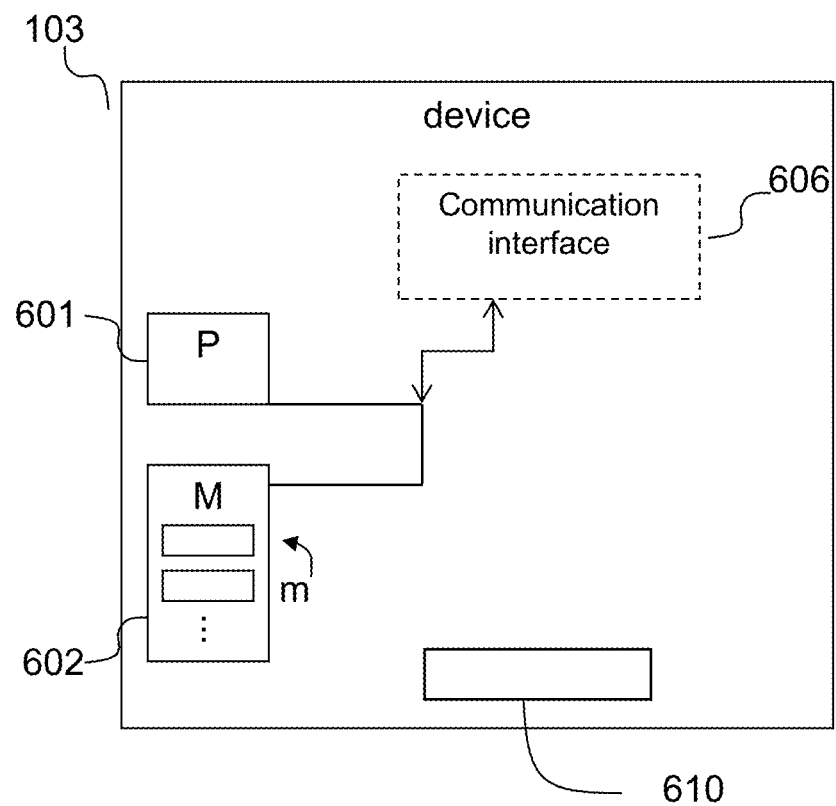
FIG. 6 is a view of a device that is to be located.

The device 103 that is to be located using the locator device can be a small device attachable to any object that a user would want to be able to locate. The device 103 can also be integrated in an existing device such as a smart phone. An exemplary device 103 is depicted in FIG. 6. In FIG. 6 an exemplary embodiment of a device 103 is depicted. The device 103 may be implemented by a hardware device that can have program modules of a respective computer program comprising code means which, when run by a processing unit 601 causes the device 101 to perform the above-described methods. The processing unit 601 may comprise a single Central Processing Unit (CPU), or could comprise two or more processing units. For example, the processing unit 601 may include general purpose microprocessors, instruction set processors and/or related chips sets and/or special purpose microprocessors such as Application Specific Integrated Circuits (ASICs). The processing unit 601 may also comprise a storage for caching purposes.

Each computer program may be carried by a computer program product 602 in the device 103 in the form of a memory having a computer readable medium and being connected to the processing unit 601. The computer program product 602 or memory thus comprises a computer readable medium on which the computer program is stored e.g. in the form of computer program modules "m". For example, the memory 602 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the device 602.

The device 103 may further comprise a communication unit 606. The communication unit is in particular arranged to communicate with the locator device 101 via a direct radio communication channel. The communication unit 606 may also be arranged for programming and/or configuration of the device 103. In an embodiment the communication unit 606 may comprise chip set adopted for communication via IEEE 802.11 (Institute of Electrical and Electronics Engineers), including but not limited to 802.11a/b/n or other similar forthcoming standards. Other examples of standards which may be supported by the communication unit 606 are: Zigbee, Bluetooth, RFID (Radio frequency identification), USB (Universal serial bus). The communication unit 606 may comprise an antenna. The communication unit 606 may be connectable to an external antenna.

The device 103 may comprise a power supply unit 610. The power supply unit may be arranged for power supply of: the processing unit 601, the memory unit 602, and/or the communication unit 606. Examples of a power supply unit 610 are, battery, capacitor, fuel cell, solar cell, inductive contact, USB-contact (Universal serial bus), wired contact, not limiting to other examples suitable for a power supply unit 610.

Using the method, devices and computer programs as described herein it is made possible to locate a device in a cost efficient and simple manner.

The invention claimed is:

1. A method of determining the location of a device comprising a radio transceiver, the method comprising:
   receiving in a mobile locator device a radio signal from said device,
   determining a distance to said device from the locator device at the position of the locator device, said determined distance having a determined distance accuracy, and/or determining a direction to the device with a determined direction accuracy, wherein said determined distance and/or direction is based on the radio signal received from the device,
   forming a geographical area with boundaries set as the determined distance+/−said determined accuracy, and/or as the determined direction+/−said determined direction accuracy,
   subdividing said geographical area into a number of sub-areas and removing any sub area that is not included in all geographical areas formed for each new position of the locator device,
   moving said locator device to a new position and repeating removal of subareas for new positions of the locator device until the total area of the remaining sub-areas is below a threshold value, and
   determining the location of the device as the area of the remaining sub-areas.

2. The method according to claim 1, wherein sub-areas are successively removed until the number of remaining sub-areas is reduced to only one remaining sub-area.

3. The method according to claim 1, wherein the received signal from the device is a signal received in response to a signal transmitted to the device from the locator device.

4. The method according to claim 3, wherein the distance to the device is determined based on the roundtrip time for transmitted radio signal and the received response signal.

5. The method according to claim 4, wherein the roundtrip time is received from the device by the locator device.

6. The method according to claim 1, wherein the direction to the device is determined based on the direction having the strongest received signal strength.

7. The method according to claim 6, wherein the direction is also determined based on the direction opposite to the direction having the weakest received signal strength.

8. A mobile locator device for locating a device, the locator device comprising a radio transceiver, the locator device being adapted to:
   receive a radio signal from said device,
   determine a distance to said device from the locator device at the position of the locator device, said determined distance having a determined distance accuracy, and/or determine a direction to the device with a determined direction accuracy, wherein said determined distance and or direction is based on the radio signal received from the device, form a geographical area with boundaries set as the determined distance+/−said determined accuracy, and/or as the determined direction+/−said determined direction accuracy, subdivide said geographical area into a number of sub-areas, and remove any sub area that is not included in all geographical areas formed for each new position of the mobile device, determine the location of the device as the remaining area(s) when the total area of the remaining sub-areas is below a threshold value.

9. The locator device according to claim 8, wherein the locator device is adapted to determine the location of the device when only one sub-area remains.

10. The locator device according to claim 8, wherein the locator device is adapted to transmit a signal to the device requesting a response from the device.

11. The locator device according to claim 10, wherein the locator device is adapted to determine the distance to the device based on the roundtrip time for transmitted radio signal and the received response signal.

12. The locator device according to claim 11, wherein the locator device is adapted to receive the roundtrip time from the device.

13. The locator device according to claim 8, wherein the locator device is adapted to determine the direction to the device based on the direction having the strongest received signal strength.

14. The locator device according to claim 13, wherein the locator device is adapted to determine the direction also based on the direction opposite to the direction having the weakest received signal strength.

* * * * *